Oct. 27, 1931.  R. M. HEAMES ET AL  1,829,351
APPARATUS FOR HEADING BLANKS
Filed April 23, 1928    3 Sheets-Sheet 1
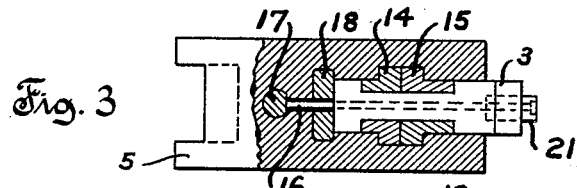
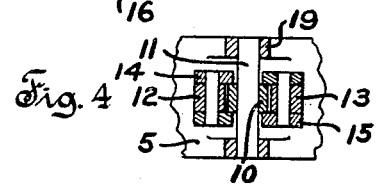
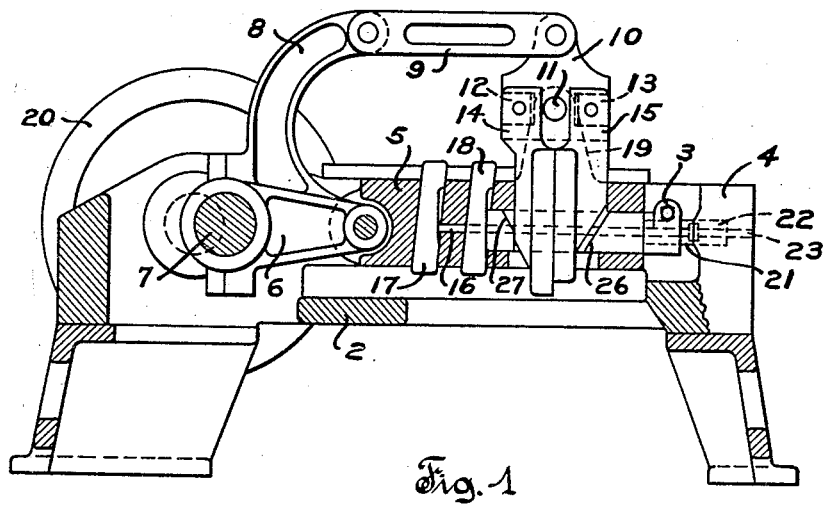
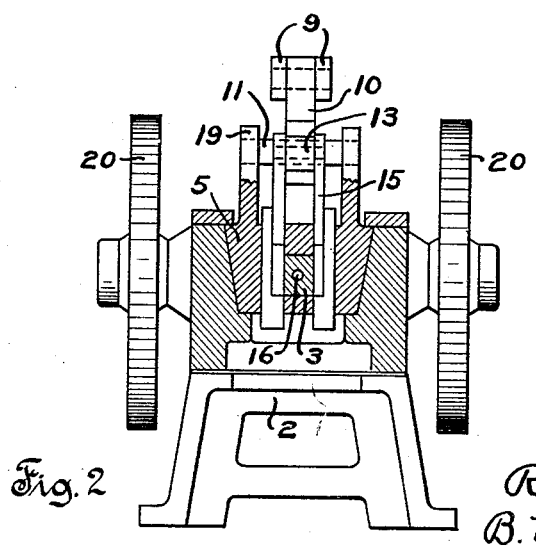
Inventors
R. M. Heames
B. W. Lindquist
by W. H. Lieber
Attorney

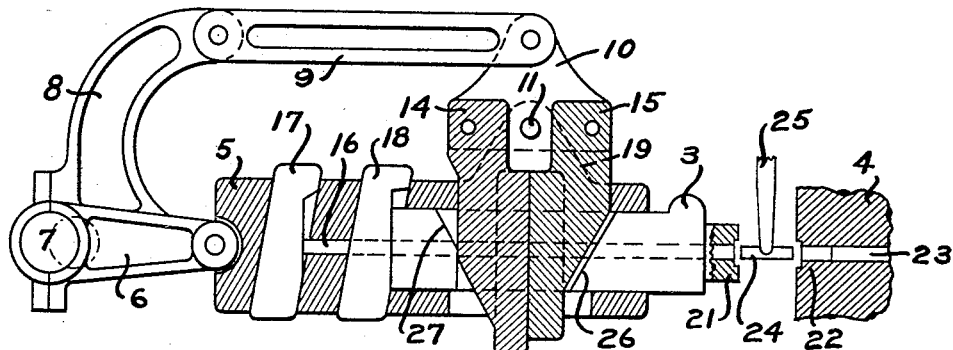
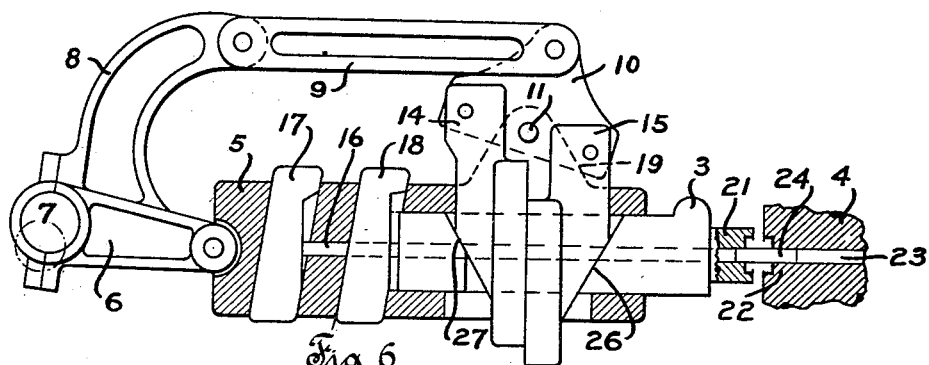
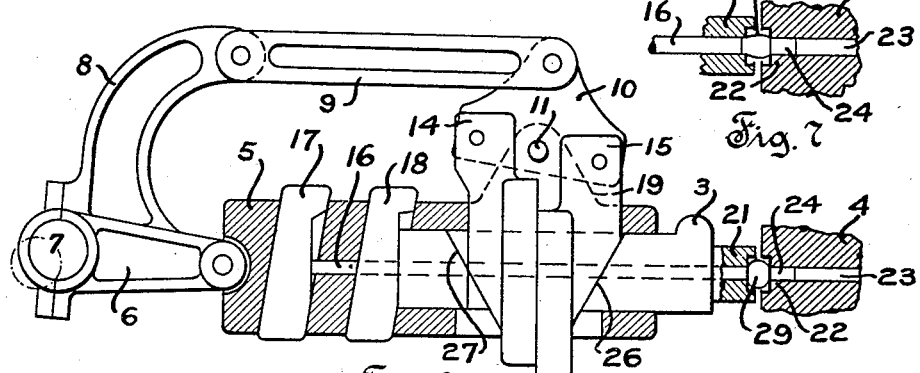
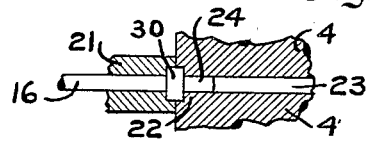

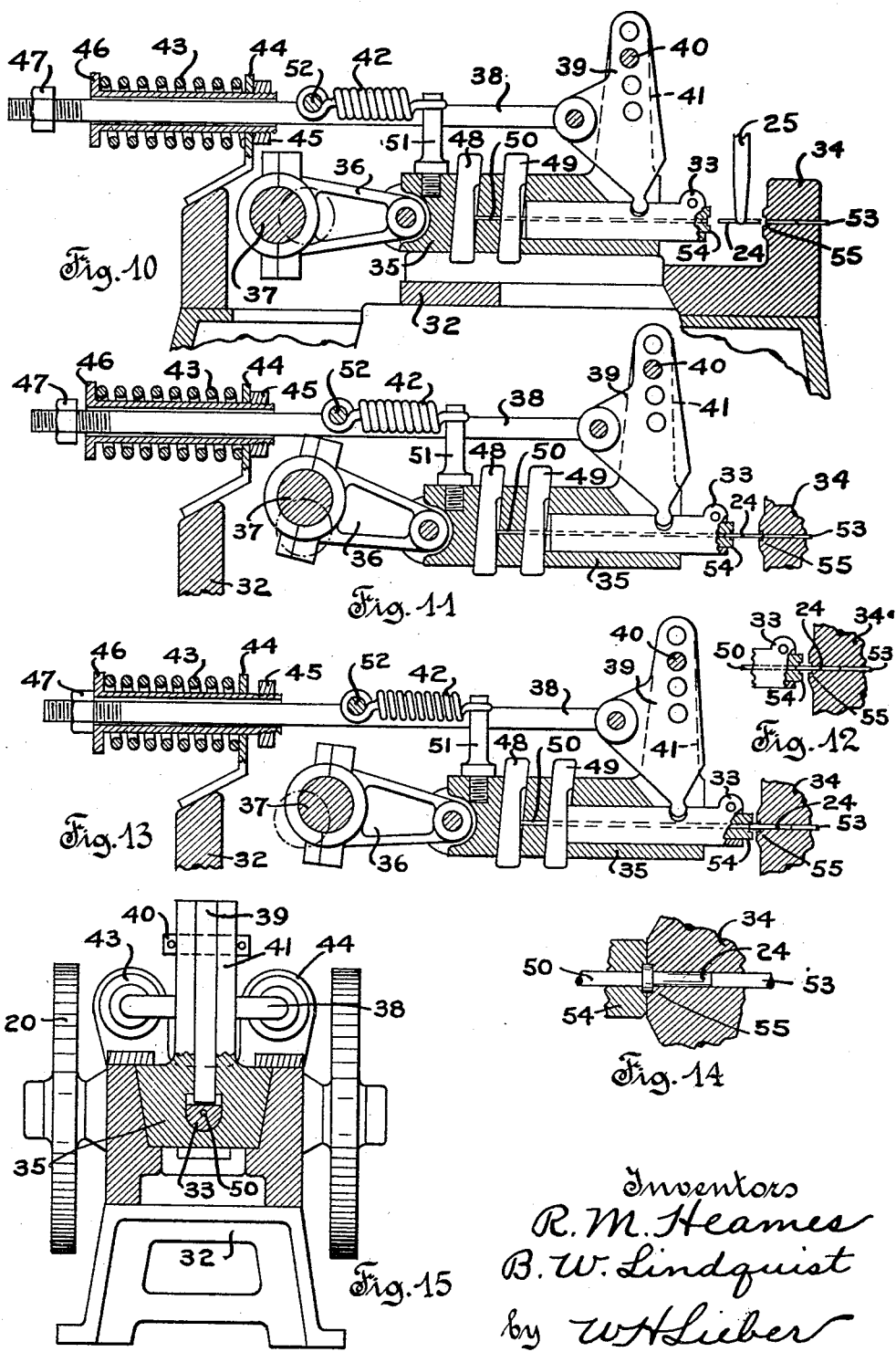

Patented Oct. 27, 1931

1,829,351

UNITED STATES PATENT OFFICE

RICHARD M. HEAMES, OF GROSSE POINTE, AND BIRGER W. LINDQUIST, OF DETROIT, MICHIGAN

APPARATUS FOR HEADING BLANKS

Application filed April 23, 1928. Serial No. 272,011.

The present invention relates in general to improvements in the art of forming metal articles by distortion of stock having predetermined characteristics, and relates more specifically to an improved apparatus for locally enlarging metal blanks or the like to form heads thereon.

Generally stated, it is an object of the present invention to provide simple, compact and efficient mechanism for heading blanks.

It is common practice in the art of heading metal stock such as cap screw and bolt blanks, either to confine one end only of each blank and to deliver one or more blows against the opposite unconfined end in order to cause lateral spreading thereof into a properly shaped recess having the shape of the final head desired; or to confine both ends of the blank and to deliver a first blow in order to cause slight lateral distortion adjacent to the shank end, and to complete the lateral distortion with a second blow after the head end of the blank has been released. For various reasons, such as the irregular formation of the end of the blank to which the distorting pressure is applied, the end pressure produces off-setting or bending of the unconfined blank portion, during either the first or succeeding blows, thereby setting up unsymmetrical and hence unequal stresses, in the completed head, which frequently results in peripheral cracks or partly folded flow lines. While it has heretofore been attempted to obviate this unequal stressing and undesirable grain flow of the metal in the heads of cap screw and bolt blanks, these prior attempts have been relatively unsuccessful in avoiding peripheral rupture and undesirable grain structure in the expanded portion.

It is a more specific object of the present invention to provide improved apparatus for distorting or heading, wherein symmetrical outward flow of the material during the formation of the enlargement or head, is insured, thereby providing for uniform distribution of the stresses and grain structure in the enlarged portion of the blank and materially reducing external fractures in the periphery of the enlarged portion. The present invention may be applied either to hot or cold upsetting in either a solid or an open die, and either single or multiple heading blows may be utilized. The invention is however, especially adapted for the production of superior finished articles by single blow heading. These and other objects and advantages resulting from the present improvement, and the mode of accomplishing the advantageous results, will be apparent from the following description.

A clear conception of two embodiments of apparatus for effecting commercial exploitation thereof, may be had by referring to the drawings accompanying and forming a part of this specification, in which like reference characters designate the same or similar parts in the various views.

Fig. 1 is a part sectional side elevation of an improved single blow heading machine completely assembled, some of the standard portions of the device having been shown more or less diagrammatically.

Fig. 2 is a part sectional end view of the improved single blow heading machine shown in Fig. 1.

Fig. 3 is a part sectional top view of the ram of the single blow heading machine shown in Figs. 1 and 2.

Fig. 4 is a fragmentary part sectional top view of the ram disclosed in Fig. 3, the section being taken through the wedge element actuating structure associated with the ram.

Fig. 5 is a somewhat diagrammatic and part sectional side elevation of the improved single blow heading machine showing the position of the elements during insertion of a blank.

Fig. 6 is a similar elevation of the improved single blow heading machine showing the position of the elements just prior to the distorting operation.

Fig. 7 is a fragmentary sectional view of the distorting mechanism showing the position thereof during the initial swelling operation.

Fig. 8 is a diagrammatic part sectional elevation of the single blow heading machine showing the position of the elements during the final heading operation.

Fig. 9 is a fragmentary sectional view of the distorting mechanism showing the position thereof upon completion of the heading operation.

Fig. 10 is a part sectional side elevation of a modified form of single blow heading machine completely assembled, some of the standard parts of the device having been shown diagrammatically.

Fig. 11 is a fragmentary part sectional side elevation of the single blow heading machine shown in Fig. 10, showing the position of the parts during insertion of the blank in the stationary die.

Fig. 12 is a fragmentary sectional view of the distorting mechanism of the modified header, showing the position thereof just prior to the heading operation.

Fig. 13 is a fragmentary part sectional side elevation of the single blow heading machine shown in Fig. 10, showing the position of the parts just after initial swelling of the blank has been effected.

Fig. 14 is an enlarged fragmentary sectional view of the distorting mechanism of the modified header, showing the position thereof upon completion of the heading operation.

Fig. 15 is a part sectional end view of the modified form of single blow header shown in Fig. 10.

While two distinct forms of single blow heading machines have been illustrated in the drawings, it will be understood that both of these machines are capable of effecting commercial exploitation of the improved process forming the subject of the present invention. These machines are capable of upsetting or heading the blanks either hot or cold, and may be provided with either a solid or an open die. Both of the machines are capable of completing each heading operation with a single blow or stroke of the machine.

Referring specifically to the embodiment of the invention illustrated in Figs. 1 to 9 inclusive, the single blow heading machine comprises in general a main frame 2 forming a rigid support for a stationary die block 4 having a stationary die 22 associated therewith; a movable ram 5 slidable upon the main frame 2 and providing a support for a reciprocable die carrier 3 having a punch 21 associated therewith; and mechanism including a connecting rod 6, an actuating crank 7, and suitable fly wheels 20 for periodically reciprocating the ram 5 and the elements associated therewith, upon the main frame 2 and relative to the stationary die 22.

The frame 2, die block 4 and stationary die 22 are of relatively standard construction, the latter being of the solid type and being removably from the block 4. The die block 4 is provided with a central hole within which a knock-out pin 23 is adapted to be fixedly positioned in order to provide a stop for the blank 24 during the heading operation, and along which the pin 23 is movable in order to eject the headed blanks.

The ram 5 is guided in the frame 2 for movement toward and away from the stationary die 22 by means of the crank 7 and connecting rod 6. The ram 5, die carrier 3 and punch 21 have a central hole therein in alinement with the hole of the stationary die 22, and a rod 16 which reacts against an adjusting wedge 17 carried by the ram 5, is disposed within the hole of the movable elements. The punch carrier 3 is movable relative to the ram 5, by means of vertically movable front and rear wedge elements 15, 14 respectively, which are provided with inclined surfaces adapted to cooperate with adjacent inclined surfaces 26, 27 respectively, of the carrier 3, and which are provided with directly coacting adjacent surfaces. The rear end of the punch carrier is also engageable with an adjusting wedge 18 carried by the ram 5, for limiting the motion of the carrier 3. A rocking member 10 is pivotally supported upon standards 19 carried by the arm 5, by means of a pin 11, and has oppositely disposed recesses within which cross-heads 12, 13 are slidably disposed. The rear wedge element 14 is pivotally connected to the cross-head 12 and the front element 15 is likewise connected to the cross-head 13. The upper end of the member 10 is pivotally associated with the forward ends of a set of links 9, the rear ends of which are likewise associated with the upper end of an arm 8 formed integral with the connecting row 6.

During normal operation of the single blow header illustrated in Figs. 1 to 9 inclusive, the ram 5 and the elements carried thereby are being reciprocated upon the frame 2 by means of the crank 7 and the connecting rod 6. When the crank 7 is positioned as shown in Fig. 5, the punch 21 is retracted from the stationary die 22 a maximum amount and the end of the pressure rod 16 is flush with the end surface of the punch 21 as shown. A blank 24 may be freely inserted between the punch 21 and the die 22 while the elements are thus separated, by means of fingers 25 of well known structure which hold the blank 24 until the shank end thereof has been pushed into the hole of the die 22 whereupon the fingers 25 are withdrawn. The mechanism for actuating the fingers 25 is well known to those skilled in the art. As the crank 7 advances the elements to the position shown in Fig. 6, the ram 5 and rod 16 push the blank into engagement with the relatively fixed knock out pin 23, and the arm 8, links 9, member 10 and wedge elements 14, 15 function to slide the carrier 3 and the punch 21 forwardly a slight distance beyond the end of the rod 16 thereby snugly confining the adjacent end of the blank 24 against lateral distortion. The crank 7 then advances the ram 5 and the rod 16 so as to apply end pressure to the blank thus causing initial swelling 28 of the medial unconfined portion of the blank. During this advancement of the ram 5 and the rod 16, the wedge elements 14, 15 function to retract the punch 21 thereby releasing the confined outer end of the blank and permitting the swelling to gradually advance toward the blank end. When the elements are advanced to the position shown in Fig. 8, the end of the rod 16 is again flush with the adjacent end surface of the punch 21, and these elements are advancing together and cooperate to form a symmetrical enlargement 29 at the end of the blank. This simultaneous advancement of the rod 16 and punch 21 continues until the completed head 30 has been produced as shown in Fig. 9. The crank 7 thereafter functions to separate the punch 21 and the die 22 whereupon the knock out pin 23 may be operated in the usual manner to eject the finished blank, and a fresh blank may be supplied by the fingers 25. It should be borne in mind that all of the foregoing operations take place during each revolution of the crank 7, and that the advancement of the ram 5 and rod 16 is accomplished with such speed as to constitute a single heading blow. A completely headed blank is therefore produced during each forward movement of the ram 5 and rod 6 toward the stationary die 22, and the various elements may be adjusted to accommodate blanks of different lengths.

Referring specifically to the modified embodiment of the invention illustrated in Figs. 10 to 15 inclusive, the single blow heading machine comprises in general a main frame 32 forming a rigid support for a stationary die block 34 having a fixed die 55 associated therewith; a movable ram 35 slidable upon the main frame 32 and providing a support for a relatively reciprocable die carrier 33 having a punch 54 associated therewith; and mechanism including a connecting rod 36, an actuating crank 37, and suitable fly wheels 20 for periodically reciprocating the ram 35 and the various elements associated therewith, upon the main frame 32 and relative to the fixed die 55. This modified machine may be designated as the spring type as distinguished from the wedge type of machine previously described, because of the spring structure for actuating the punch carrier, which will be subsequently described in detail.

As in the case of the wedge type, the frame 32, die block 34 and die 55 of the spring type machine are of standard construction. The die block 34 is provided with a central hole within which a knock out pin 53 is adapted to be fixedly positioned in order to provide a stop for the blank 24 during the heading operation, and along which the knock out pin is movable in order to eject the finally headed blanks.

The ram 35 is guided in the frame 32 for movement toward and away from the stationary die 55 by means of the crank 37 and the connecting rod 36. The ram 35, die carrier 33 and punch 54 are provided with a central hole disposed in alinement with the hole of the stationary die 55, and a push rod 50 which reacts against an adjusting wedge 48 carried by the ram 35, is disposed within the hole of the movable elements. The punch carrier 33 is movable relative to the ram 35, by means of a lever 39 swingably suspended from standards 41 formed integral with the ram 35 by means of a pivot pin 40. Rods 38 have their forward ends pivotally associated with the lever 39 and have rear ends which penetrate a stationary abutment plate 44. The rear ends of the rods 38 are provided with adjustable nuts 47, and tubular members 46 embrace the rods 38 and are slidably associated with the plate 44. Helical compression springs 43 embrace the tubular members 46 and react at their opposite ends against the plate 44 and the end flanges of the members 46. The forward ends of the members 46 are provided with adjustable elements 45 which are cooperable with the plate 44 to limit the action of the springs 43. One or more auxiliary tension springs 42 connect a transverse pin 52 secured to the rods 38, with the ram 35 through columns 51. The lower swinging end of the lever 39 coacts with a recess in the punch carrier 33, and the rearward travel of the carrier 33 is limited by an adjustable wedge 49 carried by the ram 35.

During normal operation of the modified spring type single blow header illustrated in Figs. 10 to 15 inclusive, the ram 35 and the elements carried thereby are reciprocated upon the frame 32 by means of the crank 37 and the connecting rod 36. When the crank 37 is positioned as shown in Fig. 10, the ram 35 is withdrawn from the stationary die 55 a maximum amount, and the springs 42 have functioned to position the punch 54 as shown. A blank 24 may then be inserted between the punch 54 and the die 55 while the elements are separated, with the aid of fingers 25 of usual construction which hold the blank until the shank end thereof has been snugly confined within the hole of the stationary die 55 whereupon the fingers are withdrawn. As the crank 37 moves the elements to the position shown in Fig. 11, the ram 35 and rod 50 push the blank into engagement with the fixed knock out pin 53, and the carrier 33 and punch 54 which have previously been slid forwardly a slight distance beyond the end of the rod 50 by the springs 42, confine the adjacent end of the blank 24 against lateral enlargement. The crank 37 then advances the ram 35 and the rod 50 so as to apply end pressure to the blank, thus producing initial swelling of the unconfined portion of the blank. During this advancement of the ram 35 and the rod 50, the nuts 47 at the rear ends of the rods 38 come into engagement with the flanged ends of the tubular members 46, thereby causing the compression springs 43 to act against the nuts 47 and simultaneously causing the tension springs 42 to be expanded as shown in Fig. 13, and also retracting the punch 54. When the punch 54 is thus retracted or withdrawn, the confined outer end of the blank is released and the swelling of the blank is permitted to advance toward the extremity thereof. The elements are subsequently advanced to the position shown in Fig. 14 wherein the head has been completely formed.

From the foregoing description it will be apparent that both of the machines are capable of effectively producing a properly headed blank with a single blow. By initially confining both ends of the blank against lateral distortion or enlargement while producing preliminary swelling of an intermediate portion, symmetrical and uniform outward distortion of all of the grain lines is insured, and a highly durable and commercial final product results. The product thus produced is devoid of undesirable stresses and strains, and the grain flow is relatively uniform throughout the upset portions. The improved process and apparatus also enable the production by single blow heading, of articles which are equal or superior to the similar articles heretofore produced by multiple blow heading in any sequence. It will be apparent, however, that while heading with a single blow is desirable, such operation is not necessary in exploiting the improved process, and that this process is also capable of exploitation in multiple blow headers.

It should be generally understood that it is not desired to limit the invention to the precise steps of the process herein described, or to the exact details of construction of the apparatus herein shown, for various modifications within the scope of the claims may occur to persons skilled in the art.

It is claimed and desired to secure by Letters Patent:—

1. In a header, a stationary die formed to snugly laterally confine the shank end of a blank, an element normally separated from said die for the insertion of a blank therebetween, said element being movable toward said die during the entire heading operation and having a bore formed to snugly laterally confine the opposite end of the blank prior to head thereof, a rod movable within said bore to apply initial heading pressure against the end of a blank confined therein, and means for simultaneously moving said element and said rod relatively to each other and toward said die to remove the blank end from said bore and to apply final heading pressure against said blank end after removal thereof from said bore.

2. In a header, a stationary die formed to snugly laterally confine the shank end of a blank, a carrier movable toward said die during heading operation and having a bore formed to snugly laterally confine the opposite end of the blank prior to head thereof, a rod movable within said bore to apply initial heading pressure against the end of a blank confined therein, a ram movably supporting both said carrier and said rod, and means for moving said ram to simultaneously advance said carrier and said rod relatively to each other and toward said die to remove the blank end from said bore and to apply heading final pressure against said blank end after removal thereof from said bore.

In witness whereof, the signatures of the inventors are affixed hereto.

RICHARD M. HEAMES.
BIRGER W. LINDQUIST.

CERTIFICATE OF CORRECTION.

Patent No. 1,829,351.  Granted October 27, 1931, to

RICHARD M. HEAMES ET AL.

It is hereby certified that error appears in the printed specification of the above numbered patent requiring correction as follows: Page 4, lines 57 and 71, claims 1 and 2, respectively, for "head" read heading; and that the said Letters Patent should be read with these corrections therein that the same may conform to the record of the case in the Patent Office.

Signed and sealed this 8th day of December, A. D. 1931.

(Seal)

M. J. Moore,
Acting Commissioner of Patents.